Sept. 4, 1928.  A. S. RAMSAY  1,683,300
DIRIGIBLE HEADLIGHT
Filed Oct. 20, 1926
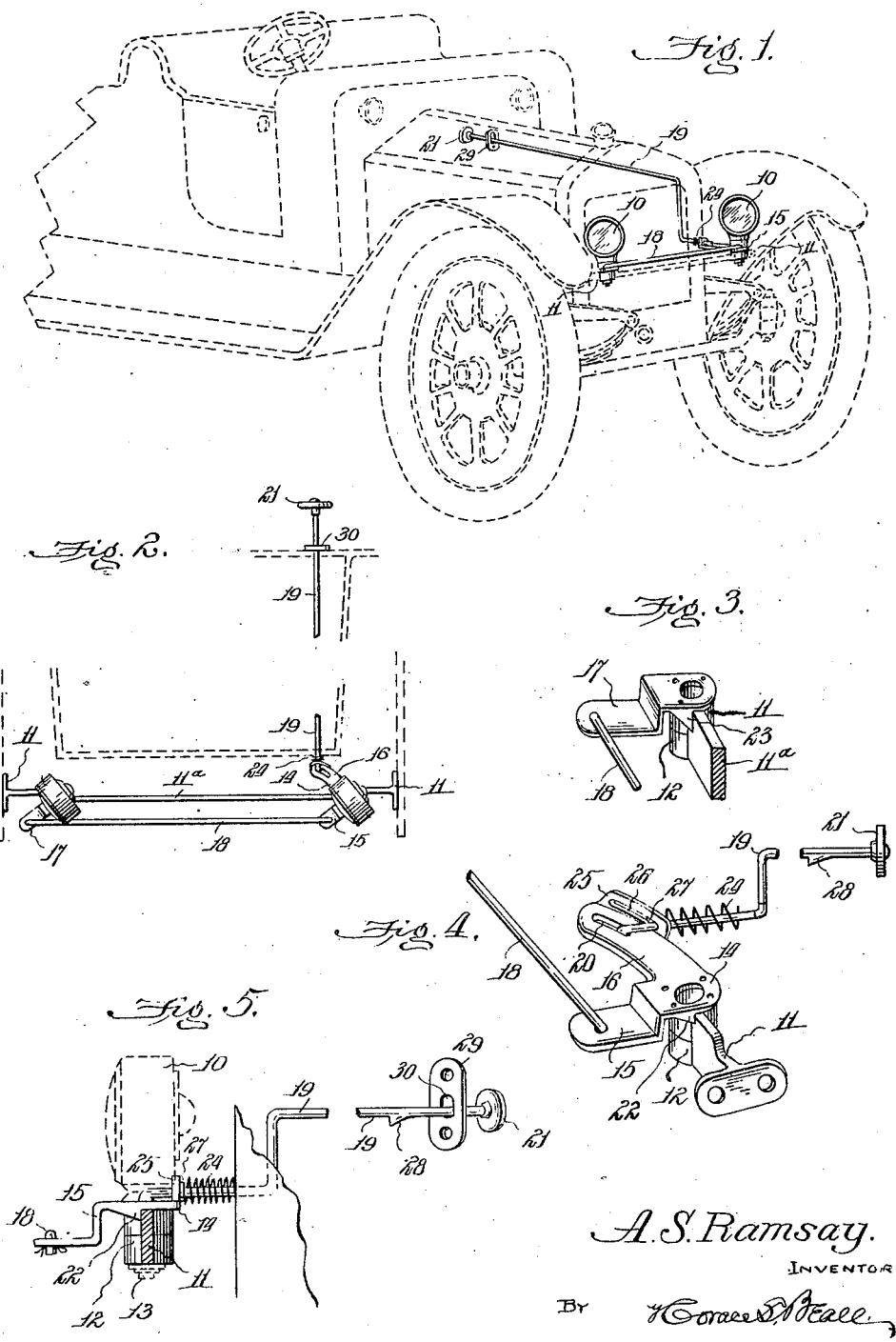
A. S. Ramsay.
INVENTOR.

Patented Sept. 4, 1928.

1,683,300

UNITED STATES PATENT OFFICE.

ANSIL S. RAMSAY, OF TROY, ALABAMA.

DIRIGIBLE HEADLIGHT.

Application filed October 20, 1926. Serial No. 142,926.

My invention is an improvement in dirigible headlights for automobiles, in the present instance providing mechanism adapted to be manually operated for changing the direction of the headlights for a particular purpose.

In the operation of an automobile over a roadway it is customary to dim the headlights on the approach of an automobile from the opposite direction to moderate the lights projected towards the approaching driver, and in such instances the dimmed headlights do not light the roadway sufficiently for the driver to safely drive the automobile over the roadway. To overcome this difficulty I provide in connection with dirigible headlights manually operated mechanism by means of which the driver can quickly change the direction of the headlights towards the right-hand side of the roadway, thereby not only preventing the full glare of the headlights from shining into the eyes of the approaching driver but at the same time lighting that side of the roadway along which he is driving.

With this primary object in view my invention consists in providing dirigible headlights with means by which the driver can conveniently shift the same from a normal position directing the lights to the front of the automobile to a position directing the lights at an oblique angle towards the right of the automobile, the operating mechanism being so constructed that the headlights will be firmly held in both positions under spring tension which also serves to automatically return the headlights to normal position upon releasing the operating rod; all as hereinafter fully described and specifically set forth in the appended claim.

In the drawings:

Figure 1 is a perspective view, showing the application of my invention.

Fig. 2 is a detail plan view.

Fig. 3 is an enlarged detail perspective view of an arm used in connection with one of the headlights, and including the lamp supporting bracket with which it cooperates.

Fig. 4 is a perspective view of a combined arm and lever used in connection with the other headlight, including the cooperating lamp supporting bracket.

Fig. 5 is a side elevation of the means for operating the headlights.

The headlights or lamps 10 10 to which my invention is applied are mounted on brackets 11 attached as usual to the opposite front fenders of the automobile and curved to suitably position the headlights with respect to the front of the automobile, said brackets being connected by a cross-bar 11ª and at the juncture of each bracket with the cross-bar there is formed a round socket 12 upon which the lamp is mounted and through which the pintle 13 (Fig. 5) passes for rotatably supporting the lamp. This is an ordinary way of supporting dirigible headlights and is shown to illustrate the application of my invention, it being understood that any other type of lamp supporting bracket may be employed which will cooperate with the mechanism hereinafter described.

In carrying out my invention I rivet or otherwise attach to the base of one of the lamps or headlights—preferably the one at the left-hand side of the automobile—a plate 14, which will be interposed between the bottom of the lamp and top of the supporting bracket 11, said plate having a forwardly projecting member or arm 15 and a laterally projecting member or lever 16. The forwardly projecting arm 15 is for the purpose of connecting this lamp or headlight to the other lamp or headlight, and therefore the last mentioned lamp has similarly attached thereto an arm 17, these arms 15 and 17 being connected by a rod 18 whereby the turning of one of the lamps or headlights through the medium of lever 16 will turn the other; that is to say the headlights are turned in unison upon the operation of the lever 16, which in the present instance is operated by a rod 19 extending therefrom through the frame of the radiator at one side thereof and rearwardly to within easy reach of the driver of the automobile. The outer end of the rod is bent into engagement with a slot 20 in the lever 16 while at its inner end there is a knob 21 for convenience in manipulating said rod.

Following out the main purpose of my invention the headlights are turned in one direction only from their normal position facing forward, and in order to maintain the lamps or headlights firmly in the forward position, and accurately with respect to the automobile, plate 14 and arm 17 are provided each with a downwardly-projecting lip, designated by the numerals 22 and 23 respectively, said lips moving around the sockets 12 to engage the bracket 11 in the forward position of the headlights, and to firmly hold the headlights in this position, with said lips against the brackets a spring 24 is interposed between the lever 16 and the radiator frame, being in the present instance a helical spring mounted on the operating rod 19. As will be noted the spring bears at its inner end against the radiator frame, and to provide a bearing for the end that engages the lever the latter is provided with an upstanding flange 25 having a slot 26 through which the rod 19 passes for connection to the lever; a washer 27 being preferably interposed between the outer end of the spring and said flange (see Fig. 5).

The operating rod 19 is bent upwardly beyond the inner side of the radiator frame and at a suitable height extended rearwardly so that the longer horizontal portion passing through the hood will be out of the way of any mechanism that may be located therein. The rod may be in a single length or provided in lengths coupled at one or both elbows. It will be obvious that a pull on the operating rod 19 will shift the headlights to throw the beams of light therefrom to the right or upon that side of the roadway along which the automobile is travelling, and the angle to which said headlights are turned is determined by a catch 28 near the inner end of the operating rod engaging a catch-plate 29 attached to the dashboard or instrument board of the automobile, said catch-plate having a vertical slot 30 through which the rod passes and over the lower wall of which it rides for engagement to hold the headlights turned to the right, it being obvious that the spring 24 will return the headlights to normal position automatically when the rod is released and that the tension of said spring cooperating with the lips or stops 22 and 23 will firmly hold the lamps or headlights in this position against vibration.

Having in mind the main purpose of my invention—to shift the headlights from a position projecting the beams of light forwardly to the position of projecting them to one side to thereby have the effect of dimming said headlights within the vision of the driver of an approaching automobile and at the same time light the roadway along which the automobile having the dirigible headlights is moving—the manipulation of the headlights by way of the mechanism hereinbefore described will be readily understood by reference to the drawings; for in the normal position of the headlights operating rod 19 is released allowing spring 24 to move the connected arms 15 and 17 attached to the lamps so that the stops 22 and 23 will be against the brackets 11 and the lamps firmly held in the position shown in Fig. 5, and in shifting said lamps or headlights it is necessary only to draw on the rod and engage catch 28 with catch-plate 30, the parts then assuming the position shown in Figs. 1 and 2. In releasing the headlights it is necessary only to disengage the catch 28 from the catch-plate when the spring 24 will actuate lever 16 until the stops engage the bracket.

In using my invention the headlights are not dimmed but the strong beams of lights are thrown away from the approaching driver or to one side of the roadway—that side along which the automobile carrying the dirigible headlights is proceeding—with sufficient light from said headlights within the vision of the approaching driver to show him the position of the automobile, for the safety of both drivers.

I claim:—

In an automobile, the combination with the dirigible headlights and supporting brackets therefor comprising plates secured to the underside of the lamps and connected by a rod for turning said lamps in unison, of an operating member connected to one of the aforementioned plates to extend laterally therefrom and having an upstanding flange at its inner edge with slots in the flange and body portion of the member, and a stop on the plate to engage the supporting bracket for positioning the lamps to project the headlights forwardly; together with a rod slidable longitudinally through the radiator frame of the automobile and through the slot in the flange of the operating member, the outer end of said rod being bent to engage in the slot in the body portion of said operating member, a spring encircling the rod and interposed between the radiator frame and flange of the operating member for moving the lamps or headlights to normal position, an extension from the rod for convenience in moving the same against the action of the spring, and means for holding the rod temporarily.

ANSIL S. RAMSAY.